US012073452B2

(12) United States Patent
Kovalev et al.

(10) Patent No.: US 12,073,452 B2
(45) Date of Patent: Aug. 27, 2024

(54) METHOD OF PROVIDING RECOMMENDATIONS IN AN ONLINE LISTING PLATFORM

(71) Applicant: YANDEX EUROPE AG, Lucerne (CH)

(72) Inventors: Vadim Evgenevich Kovalev, Moscow (RU); Vladimir Evgenevich Levin, rp. Ozinki (RU)

(73) Assignee: Direct Cursus Technology L.L.C, Dubai (AE)

( * ) Notice: Subject to any disclaimer, the term of this patent is extended or adjusted under 35 U.S.C. 154(b) by 124 days.

(21) Appl. No.: 17/577,796

(22) Filed: Jan. 18, 2022

(65) Prior Publication Data

US 2022/0292571 A1    Sep. 15, 2022

(30) Foreign Application Priority Data

Mar. 15, 2021   (RU) .......................... RU2021106666

(51) Int. Cl.
*G06Q 30/00*     (2023.01)
*G06Q 30/0601*   (2023.01)

(52) U.S. Cl.
CPC ................. *G06Q 30/0631* (2013.01)

(58) Field of Classification Search
CPC ................................................. G06Q 30/0631
(Continued)

(56) References Cited

U.S. PATENT DOCUMENTS

| 8,370,203 B2 | 2/2013 | Dicker et al. |
| 2015/0149484 A1 | 5/2015 | Kelley |

(Continued)

FOREIGN PATENT DOCUMENTS

| CN | 103544632 A | 1/2014 |
| CN | 110457572 A | 11/2019 |

(Continued)

OTHER PUBLICATIONS

Liu et al. "BasConv: Aggregating Heterogeneous Interactions for Basket Recommendation with Graph Convolutional Neural Network", Published on May 8, 2020, https://arxiv.org/abs/2001.09900.
(Continued)

*Primary Examiner* — Anand Loharikar
(74) *Attorney, Agent, or Firm* — BCF LLP

(57) ABSTRACT

A method and a system for recommending items in an online listing platform are provided. The method comprises: receiving, from an electronic device, a request for item recommendations triggered by the user having interacted with a given item of the online listing platform; identifying, in the plurality of items, based on the given item, a set of recommendable items; obtaining user data of the user; determining, based on the user data, for a given recommendable item, a respective value of a user-specific ranking parameter, which is indicative of a likelihood value of the user perceiving the given recommendable item as being of interest to the user; ranking the set of recommendable items according to respective values of the user-specific ranking parameter, thereby generating a ranked set of recommendable items; and selecting, from the ranked set of recommendable items, at least one recommendable for presentation thereof to the user.

17 Claims, 7 Drawing Sheets

(58) Field of Classification Search
USPC ............................................... 705/26.1–27.2
See application file for complete search history.

(56) References Cited

U.S. PATENT DOCUMENTS

| | | | |
|---|---|---|---|
| 2015/0278917 A1* | 10/2015 | Stoll | ................. G06Q 30/0635 |
| | | | 705/26.7 |
| 2016/0148297 A1 | 5/2016 | Kashyap et al. | |
| 2018/0052884 A1 | 2/2018 | Kale et al. | |
| 2019/0180321 A1 | 6/2019 | Shen et al. | |
| 2019/0332946 A1 | 10/2019 | Han et al. | |
| 2019/0392330 A1 | 12/2019 | Martineau et al. | |
| 2020/0143446 A1 | 5/2020 | Zhu et al. | |
| 2020/0250734 A1 | 8/2020 | Pande et al. | |
| 2021/0056570 A1 | 2/2021 | Balakrishnan et al. | |
| 2021/0398192 A1* | 12/2021 | Mantha | .............. G06Q 30/0635 |

FOREIGN PATENT DOCUMENTS

| | | | |
|---|---|---|---|
| JP | 2012247926 A | 12/2012 | |
| KR | 20200088131 A | 7/2020 | |

OTHER PUBLICATIONS

Russian Search Report dated Jul. 10, 2024 issued in respect of the counterpart Russian Patent Application No. RU2021106666.

* cited by examiner

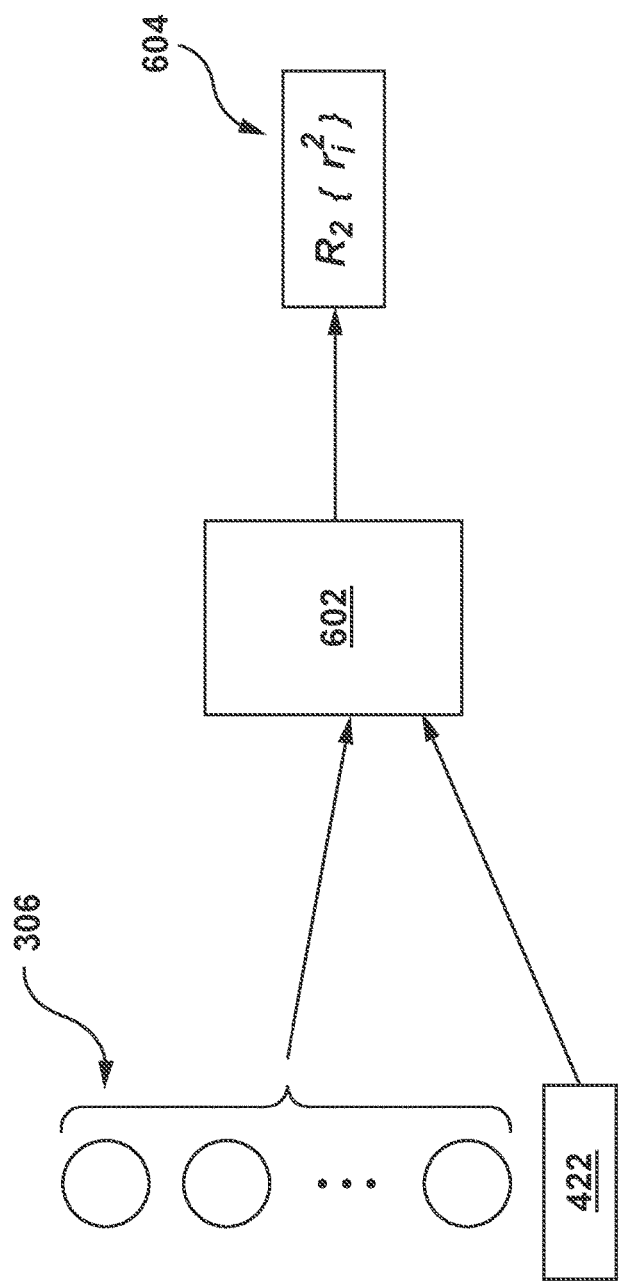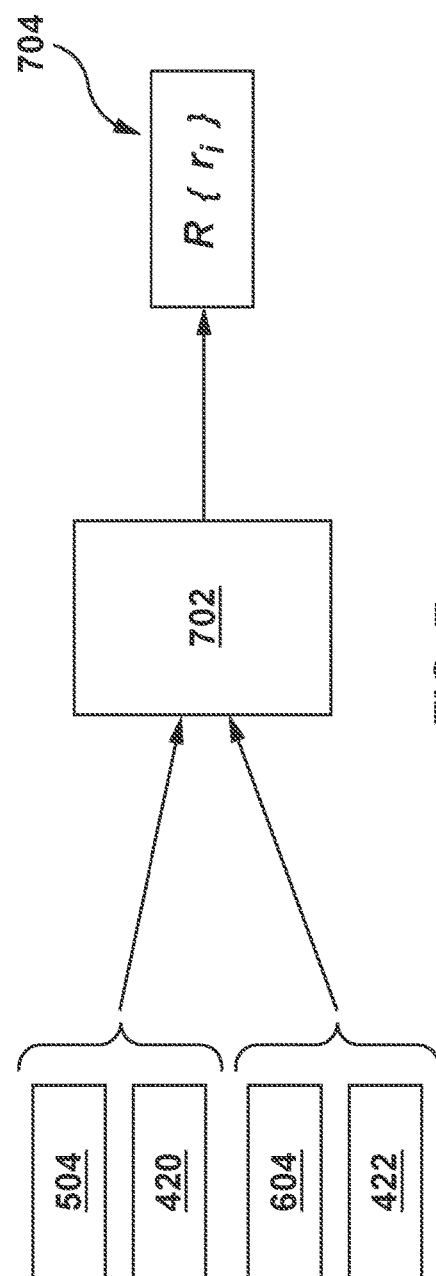

METHOD OF PROVIDING RECOMMENDATIONS IN AN ONLINE LISTING PLATFORM

CROSS-REFERENCE

The present application claims priority to Russian Patent Application No. 2021106666, entitled "Method of Providing Recommendations in an Online Listing Platform", filed Mar. 15, 2021, the entirety of which is incorporated herein by reference.

TECHNICAL FIELD

The present technology relates generally to recommendations systems; and in particular, to a method of providing user-specific recommendations to users of online listing platforms.

BACKGROUND

Growing popularity of online shopping has led to development of so-called online electronic listing platforms allowing users to make purchases of certain goods and/or services (collectively referred to herein as "items") online from one or more sellers. Generally speaking, a given online listing platform, as referred to herein, is an electronic online resource providing a capability for users to search for items of interest, acquire certain information thereon, and further buy the items of interest from the sellers. Such users may thus be referred to as "buyers". Examples of such online listing platforms may include an Amazon™ online listing platform, an Ozon.ru™ online listing platform, and a Kijiji™ online listing platform, which may include a plethora, such as hundreds, thousands, or even millions of items for presentation to the given user upon a respective search request.

One of additional capabilities the given online listing platform may provide is providing item recommendations to a given user currently interacting with a given item. For example, the given user may be searching for the given item, reviewing information about the given item for a predetermined time (for example, reading review left thereon by prior users), request more information on the given item via a dedicated dialogue box, and the like. To that end, the given online listing platform may be configured to provide, as item recommendations for the given item, one or more items which are similar to the given one the user is interacting with. For example, the similar items may include items of a same item category and/or same items available from different sellers.

However, the similar items provided by the given online listing platform may not be perceived as relevant by the given user, thus potentially negatively affecting the user experience of the given user.

Certain prior art approaches have been proposed to tackle the above-identified technical problem aimed at providing item recommendations perceived relevant by users.

US Patent Application Publication No.: 2020/250,734-A1 published on Aug. 6, 2020, assigned to Target Brands Inc, and entitled "Item Recommendations Using Convolutions on Weighted Graphs" discloses methods and systems for generating item recommendations. One method includes sampling from a weighted node-based graph to generate a sampled graph, wherein sampling includes selecting a plurality of nodes and, for each selected node, one or more node pairs. The selection of the node pairs is based at least in part based on a weight assigned to the node pair in the weighted node-based graph. The method further includes aggregating information from the one or more neighboring nodes into each corresponding node of the plurality of nodes in the sampled graph to generate a vector representation of the sampled graph. The method also includes applying a loss function to the vector representation of the sampled graph to generate a modified vector representation. The modified vector representation is used to generate, in response to identification of an item from an item collection, a selection of one or more recommended items from within the item collection.

US Patent Application Publication No.: 2015/149,484-A1 published On May 28, 2015, assigned to Here Global IBV, and entitled "Graph-based Recommendations Service Systems and Methods" discloses a recommendation engine providing recommendations by obtaining a compact graph representation representing a recommendations graph comprising of nodes and weighted edges. Each node is associated with type metadata indicating that it represents a recommendable item or a non-recommendable item. Each weighted edge is associated with edge-weight metadata. The compact graph representation can be stored in primary memory. When servicing a request for an item recommendation, the recommendation engine selects an entry node based at least in part on context metadata associated with the request, and traverses only a highly-weighted portion of the compact graph representation that is proximate to an entry node to select paths leading respectively to potential recommendation nodes. Each path is scored based on the edge-weight metadata of all segments, and at least one recommendation node is selected based at least in part on the path scores.

SUMMARY

Therefore, there is a need for systems and methods which avoid, reduce or overcome the limitations of the prior art.

Developers of the present technology have realized that the quality of item recommendations may be increased if recommendable items, for the given item the given user is interacting with, were generated based on similar interactions of prior users. More specifically, according to some non-limiting embodiments of the present technology, recommendable items may be generated, for the given item, based on a frequency of occurrence of other items having been, for example, indicated for a single purchase along with the given item, by putting indications thereof in a shopping cart by the prior users.

Further, the developers have appreciated that, to provide recommendable items relevant for the given user—that is, those that would likely be interesting to the given user—the preselected recommendable items may be ranked based on specific features of a given user's profile. Such features, according to some non-limiting embodiments of the present technology, may include, for example, features derived from user's browsing history and certain parameters and/or data of an electronic device of the given user used to access the given online listing platform. Thus, methods and systems described herein are directed to determining, for the given item, recommendable items likely to be perceived as being of interest to the given user within recommendable items considered related to the given item by the prior users of the given online listing platform.

For example, if the given user has indicated a TV set for purchase by putting an indication thereof in the shopping cart, based on data of shopping carts of prior users who have purchased this TV set before, the given online listing platform may be configured to (1) generate a set of recommendable items including items that have been purchased along with the TV set; and (2) provide an indication of a most popular one from the set of recommendable items, such as a sound system, as a top recommendable item for the TV set. However, the given online listing platform may further be configured to deduce, based on the given user's profile data, that the given user may not be interested in the sound system as they are likely to have it already. Thus, the given online listing platform may be configured to provide, as the top recommendable item to the given user, an indication of another item, such as an HDMI cable, determined as being more relevant for the given user from the set of recommendable items having been purchased along with the TV set.

Thus, non-limiting embodiments of the present technology are directed to methods and systems for determining recommendable items relevant and/or interesting to the given user more accurately, which eventually may translate in improvements of both the user experience of the given user and an average purchase size on the given online listing platform.

More specifically, in accordance with a first broad aspect of the present technology, there is provided a computer-implemented method of recommending items in an online listing platform. The online listing platform being hosted by a server. The server has access to a memory device storing a plurality of items for sale in the online listing platform, a given pair of items of the plurality of items being associated with a respective mutual popularity score indicative of a frequency of occurrence of the given pair of items having been selected, by prior users of the online listing platform, for a single purchase. The method is executable by the server including a processor communicatively coupled with an electronic device of a user. The method comprising: receiving, from the electronic device, a request for item recommendations, the request having been triggered by the user having indicated a given item of the plurality of items for purchase in the online listing platform; identifying, by the processor, in the plurality of items, based on the given item, a set of recommendable items, the identifying being based on the respective mutual popularity scores of the plurality of items relative to the given item; obtaining, by the processor, user data associated with the user; determining, based on the user data, for a given one of the ranked set of recommendable items, a respective value of a user-specific ranking parameter, the respective value of the user-specific ranking parameter being indicative of a likelihood value of the user perceiving the given one of the ranked set of recommendable items as being of interest to the user; ranking the set of recommendable items in accordance with respective values of the user-specific ranking parameter associated therewith, thereby generating a ranked set of recommendable items; and selecting, from the ranked set of recommendable items, at least one recommendable item for transmitting an indication thereof to the electronic device for presentation of the at least one recommendable item to the user.

In some implementations of the method, the respective mutual popularity score associated with the given pair of items has been determined based on historical data of the prior users of the online listing platform.

In some implementations of the method, the identifying the set of recommendable items further comprises: ranking the plurality of items according to the respective mutual popularity scores associated therewith relative to the given item; and selecting a predetermined top number of items from the plurality of items for inclusion thereof in the set of recommendable items.

In some implementations of the method, the plurality of items is representable in a form of a graph, wherein: a given node of the graph is representative of a respective one of the plurality of items, and a given edge of the graph joining a given pair of nodes associated with the given pair of items is representative of the respective mutual popularity score therebetween, and wherein the identifying the set of recommendable items comprises: identifying nodes of the graph joined with a node associated with the given item by respective edges.

In some implementations of the method, the determining the respective value of the user-specific ranking parameter includes applying, by the processor, a machine-learning algorithm (MLA) trained to determine the user-specific ranking parameter associated with the user for the given item based on the user data.

In some implementations of the method, the user data associated with the user includes one or more sociodemographic characteristics of the user, and wherein the obtaining the user data includes determining, by the processor, the one or more sociodemographic characteristics thereof.

In some implementations of the method, the one or more sociodemographic characteristics includes at least one of an age of the user, a gender of the user, an employment status of the user, and an average income of the user.

In some implementations of the method, the user data includes user browsing data and user device data of the electronic device; and the MLA includes a first model and a second model; wherein: the first model has been trained to determine a first likelihood value of the user perceiving the given one of the ranked set of recommendable items as being of interest to the user based on the user browsing data; the second model has been trained to determine a second likelihood value of the user perceiving the given one of the ranked set of recommendable items as being of interest to the user based on the user device data; and wherein: the determining the respective value of the user-specific ranking parameter comprises concatenating the first likelihood value and the second likelihood value.

In some implementations of the method, each one of the first likelihood value and the second likelihood value is assigned with a respective predetermined weight value.

In some implementations of the method, the first model and the second model have been trained independently.

In some implementations of the method, the user browsing data includes data of the user browsing a plurality of predetermined web resources.

In some implementations of the method, the user device data includes at least one of: a model of the electronic device; a manufacturer of the electronic device; a geographical data from the electronic device; and a data of applications installed on the electronic device.

In some implementations of the method, each one of the first model and the second model is re-trained at a predetermined frequency.

In some implementations of the method, the presentation of the at least one recommendable item to the user is executed for a future request for item recommendations triggered by the user indicating an other item of the plurality of items for purchase on the online listing platform, the other item being different from the given item.

In accordance with a second broad aspect of the present technology, there is provided a system for recommending items in an online listing platform. The system comprises a server hosting the online listing platform. The server includes: a processor communicatively coupled with an electronic device of a user; a memory device storing: a plurality of items for sale in the online listing platform, a given pair of items of the plurality of items being associated with a respective mutual popularity score indicative of a frequency of occurrence of the given pair of items having been selected, by prior users of the online listing platform, for a single purchase; and computer-readable instructions. The processor, upon executing the computer-readable instructions, is configured to: receive, from the electronic device, a request for item recommendations, the request having been triggered by the user having indicated a given item of the plurality of items for purchase in the online listing platform; identify, in the plurality of items, based on the respective mutual popularity scores of the plurality of items relative to the given item, a set of recommendable items, obtain user data associated with the user; determine, based on the user data, for a given one of the ranked set of recommendable items, a respective value of a user-specific ranking parameter, the respective value of the user-specific ranking parameter being indicative of a likelihood value of the user perceiving the given one of the ranked set of recommendable items as being of interest to the user; rank the set of recommendable items in accordance with respective values of the user-specific ranking parameter associated therewith, thereby generating a ranked set of recommendable items; and select, from the ranked set of recommendable items, at least one recommendable item for transmitting an indication thereof to the electronic device for presentation of the at least one recommendable item to the user.

In some implementations of the system, the processor has been configured to determine the respective mutual popularity score associated with the given pair of items based on historical data of the prior users of the online listing platform.

In some implementations of the system, wherein to identify the set of recommendable items, the processor is further configured to: rank the plurality of items according to the respective mutual popularity scores associated therewith relative to the given item; and select a predetermined top number of items from the plurality of items for inclusion thereof in the set of recommendable items.

In some implementations of the system, the processor is configured to represent the plurality of items in a form of a graph, wherein: a given node of the graph is representative of a respective one of the plurality of items, and a given edge of the graph joining a given pair of nodes associated with the given pair of items is representative of the respective mutual popularity score therebetween, and wherein to identify the set of recommendable items, the processor is configured to: identify nodes of the graph joined with a node associated with the given item by respective edges.

In some implementations of the system, to determine the respective value of the user-specific ranking parameter, the processor is configured to apply a machine-learning algorithm (MLA) trained to determine the user-specific ranking parameter associated with the user for the given item based on the user data.

In some implementations of the system, the user data associated with the user includes one or more sociodemographic characteristics of the user, and wherein to obtain the user data the processor is configured to determine the one or more sociodemographic characteristics thereof.

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smartphones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 6 depicts a schematic diagram of a process for applying, by the server present in the networked computing environment of FIG. 2, a second model to the set of recommendable items of FIG. 3 to generate, based on at least an other portion of the user data of FIG. 4, respective values of a second likelihood parameter used for determining the respective values of the user-specific ranking parameter, in accordance with certain non-limiting embodiments of the present technology;

FIG. 7 depicts a schematic diagram of a process for applying, by the server present in the networked computing environment of FIG. 2, a third model to the user data of FIG. 4, to the respective values of the first likelihood parameter of FIG. 5, and the respective values of the second likelihood parameter of FIG. 6, to determine the respective values of the user-specific ranking parameter used for ranking the set of recommendable items of FIG. 3, in accordance with certain non-limiting embodiments of the present technology;

DETAILED DESCRIPTION

Figure 1:
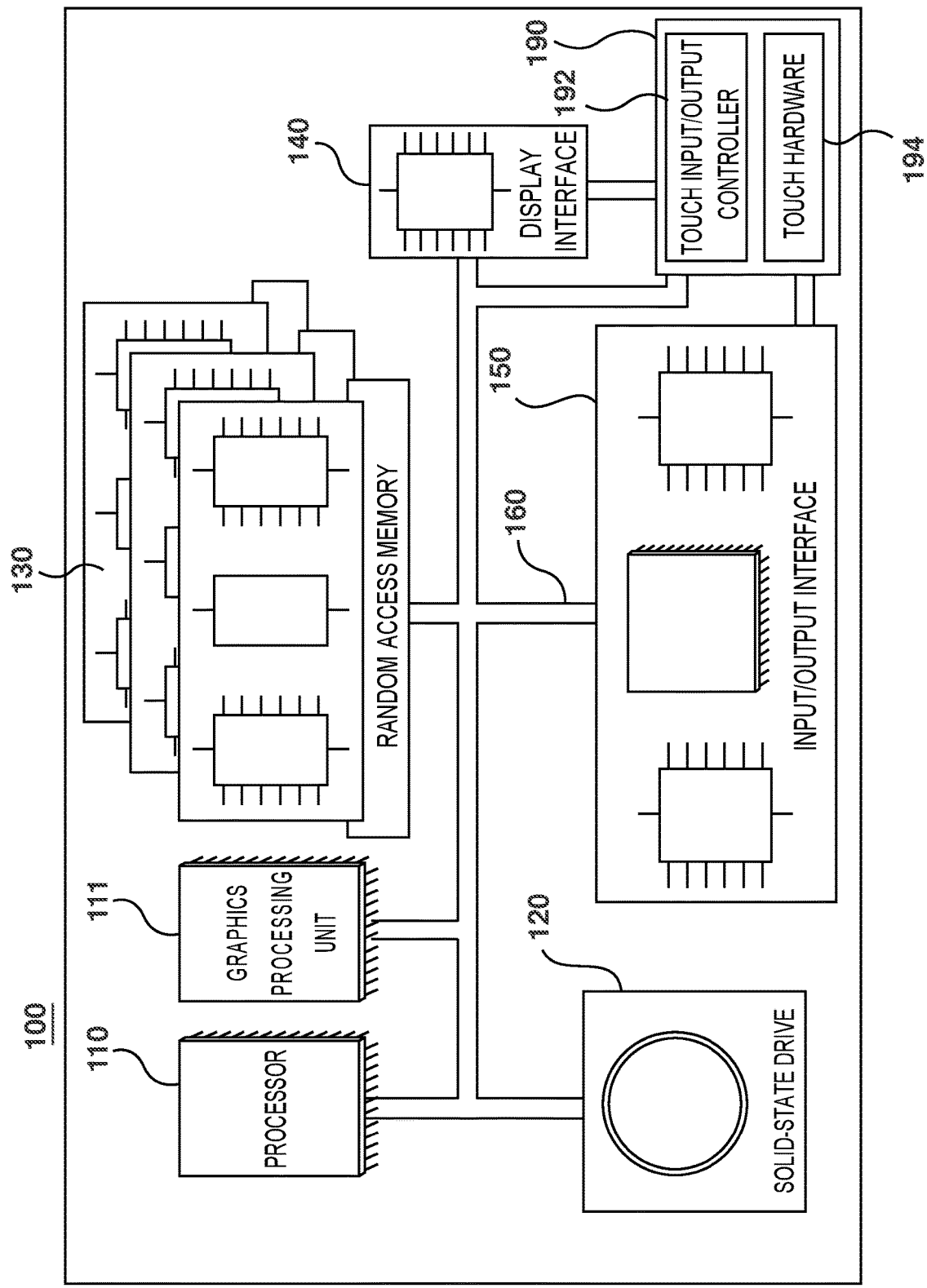
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, ramdom-access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single or multi-core processors collectively represented by a processor 110, a graphics processing unit (GPU) 111, a solid-state drive 120, a ramdom-access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may equally be referred to as a screen—such as a screen (not separately labelled) of an electronic device 210 depicted in FIG. 2. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some non-limiting embodiments of the present technology, the input/output interface 150 may be connected to a keyboard (not separately depicted), a mouse (not separately depicted) or a trackpad (not separately depicted) allowing the user to interact with the computer system 100 in addition to or instead of the touchscreen 190.

It is noted some components of the computer system 100 can be omitted in some non-limiting embodiments of the present technology. For example, the keyboard and the mouse (both not separately depicted) can be omitted, especially (but not limited to) where the computer system 100 is implemented as a compact electronic device, such as a smartphone.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
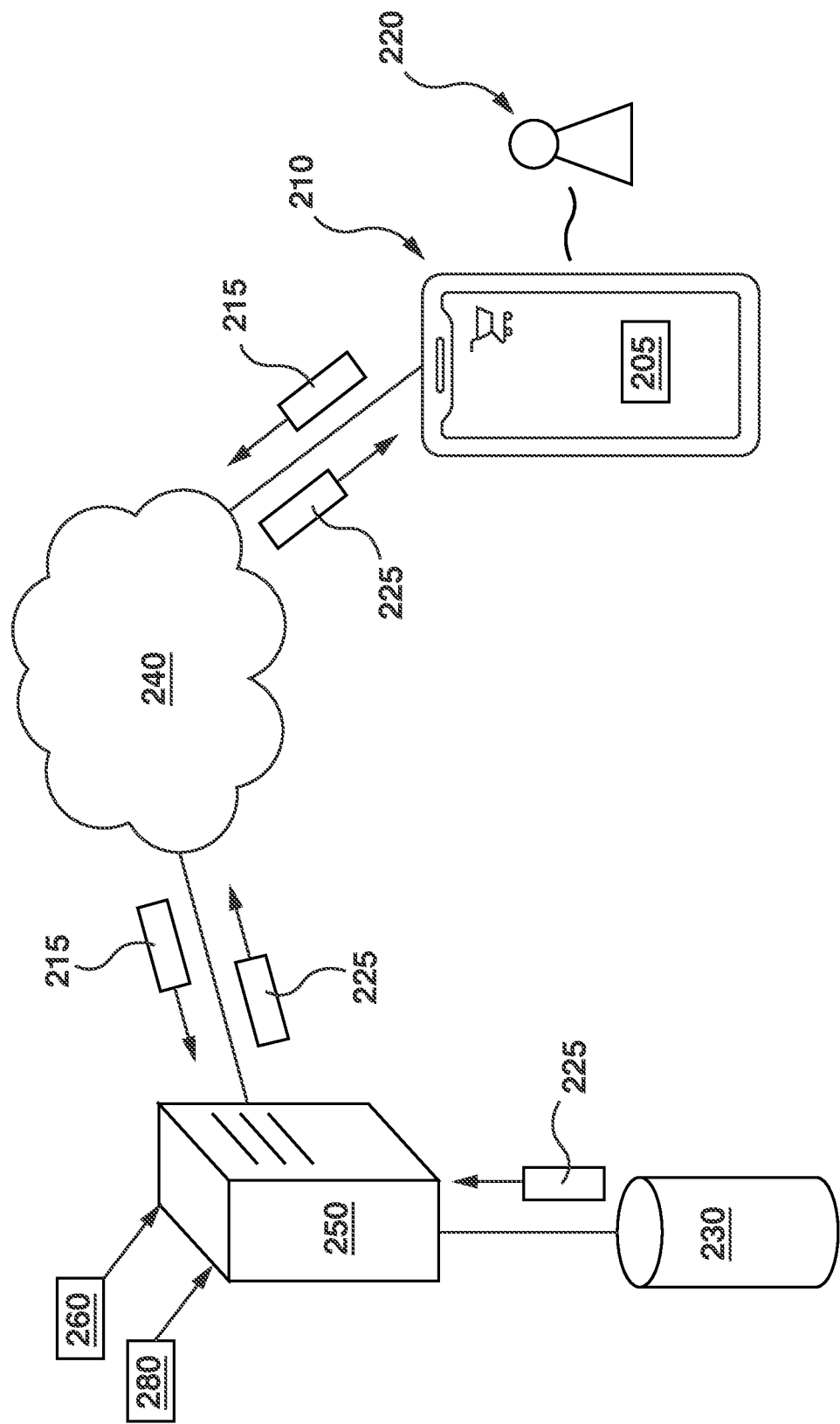
FIG. 2 depicts a schematic diagram of a networked computing environment including the computer system of FIG. 1 and being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 communicatively coupled, via a communication network 240, with a server 250. In the non-limiting embodiments of the present technology, the electronic device 210 may be associated with a user 220.

In the non-limiting embodiments of the present technology, the electronic device 210 may be any computer hardware that is capable of running a software appropriate to the relevant task at hand. Thus, some non-limiting examples of the electronic device 210 may include personal computers (desktops, laptops, netbooks, etc.), smartphones, and tablets. Thus, the electronic device 210 may comprise some or all components of the computer system 100 depicted in FIG. 1.

According to certain non-limiting embodiments of the present technology, the processor 110 of the electronic device 210 may be configured to access an online listing platform 260, which may, for example, be hosted on the server 250. Broadly speaking, the online listing platform 260 is an online resource allowing users, such as the user 220, to make purchases of various items, such as goods and services, online, from various sellers who have placed thereon indications of their items, for example, in a form of classified listings. To that end, in some non-limiting embodiments of the present technology, the server 250 may be configured to store indications of a plurality of items 235 available for sale on the online listing platform 260 in a database 230 communicatively coupled to the server 250 via a respective communication link. As a non-limiting example, the online listing platform 260 may be a Yandex.Market™ online listing platform operated by Yandex LLC of 16 Lev Tolstoy Street, Moscow, 119021, Russia.

Further, in some non-limiting embodiments of the present technology, the server 250 can be implemented as a conventional computer server and may comprise some or all of the components of the computer system 100 of FIG. 1. In one non-limiting example, the server 250 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 250 is a single server. In alternative non-limiting embodiments of the present technology (not depicted), the functionality of the server 250 may be distributed and may be implemented via multiple servers.

In some non-limiting embodiments of the present technology, the server 250 can be operated by the same entity that has provided the online listing platform 260. For example, if the online listing platform 260 is the Yandex.Market™ online listing platform, the server 250 can also be operated by Yandex LLC of 16 Lev Tolstoy Street, Moscow, 119021, Russia. In alternative non-limiting embodiments of the present technology, the server 202 can be operated by an entity different from the one that has provided the online listing platform 260.

Thus, according to certain non-limiting embodiments of the present technology, using the electronic device 210, the user 220 may be enabled to interact with a given item 205 of the plurality of items 235 of the online listing platform 260. For example, the user 220 may search the plurality of items 235 for the given item 205, acquire information on the given item 205, contact an associated seller for more detailed requests regrading the given item 205, access reviews left by prior users having bought the given item 205 previously, and the like.

At some point of the user 220 interacting with the given item 205, the server 250 may be configured to provide the user 220 with one or more item recommendations. For example, in some non-limiting embodiments, upon receiving a recommendation request 215 triggered by a predetermined user interaction of the user 220, the server 250 may be configured to provide at least one recommended item 225 via an associated interface of the online listing platform 260. For example, in some non-limiting embodiments of the present technology, the recommendation request 215 may be triggered by the user 220 indicating the given item 205 for purchase. To that end, the online listing platform 260 may provide, on the electronic device 210, an interface of a shopping cart, where the user 220 may place an indication of the given item 205, thereby indicating their intent to buy the given item 205.

Thus, responsive to receiving the recommendation request 215, the server 250 may be configured to retrieve, from the database 230, at least one recommended item 225. Further, in some non-limiting embodiments of the present technology, the server 250 may be configured to present an indication of the at least one recommended item 225 in the interface of the shopping cart of the online listing platform 260 along with that of the given item 205 previously indicated by the user 220 for purchase. For example, the server 250 may be configured to present the indication of the at least one recommended item 225 in a "Related Items" section of the shopping cart of the online listing platform 260 enabling the user 220 to notice the at least one recommended item 225 and interact therewith—such as clicking on the indication of the at least one recommended item 225, as an example.

As will be explained in greater detail below, in some non-limiting embodiments of the present technology, the server 250 may be configured to provide the at least one recommended item 225 as at least one of a set of recommendable items. In some non-limiting embodiments of the present technology, the set of recommendable items may comprise items identified, in the plurality of items 235, as being most frequently indicated, by the prior users, for a common purchase along with the given item 205. How the server 250 may be configured to determine the set of recommendable items within the plurality of items 235 of the online listing platform 260, in accordance with certain non-limiting embodiments of the present technology, will be described below with reference to FIG. 3.

Further, in other non-limiting embodiments of the present technology, the server 250 may further be configured to rank the set of recommendable items according to respective values of a user-specific ranking parameter associated therewith, and further determine the at least one recommended item 225 as being top of the so ranked set of recommendable items.

In the context of the present specification, the user-specific ranking parameter denotes a parameter indicative of a likelihood of a given user, such as the user 220, perceiving a given one of the set of recommendable items as being of interest to them. In other words, as may become apparent from the description provided hereinbelow, a respective value of the user-specific ranking parameter associated with the given recommendable item may be said to be representative of how likely the user 220 would interact with the given recommendable item when presented therewith, provided that the user has indicated the given item 205 for purchase.

In some non-limiting embodiments of the present technology, the server 250 may be configured to determine the user-specific ranking parameter based on user data associated with the user 220. The details of how the user data can be determined, in accordance with certain non-limiting embodiments of the present technology, will be described below with reference to FIG. 4.

Thus, based on the user data, the server 250 may be configured to determine respective values of the user-specific ranking parameter of each one of the set of recommendable items to determine the at least one recommended item 225 for the given item 205. To that end, in some non-limiting embodiments of the present technology, the server 250 may be configured to apply a machine-learning algorithm (MLA) 280, having been trained, for example, by the server 250, to determine the respective values of the user-specific ranking parameter associated with the user 220 based on a training set of data. Accordingly, in these embodiments, the server 250 may have been configured to generate the training set of data based on analyzing data of items indicated for purchase by training users (such as the prior users of the online listing platform 260) and training user data associated therewith.

In the non-limiting embodiments of the present technology, the MLA 280 may be based on neural networks (NN), convolutional neural networks (CNN), decision tree models, gradient boosted decision tree based MLA, association rule learning based MLA, Deep Learning based MLA, inductive logic programming based MLA, support vector machines based MLA, clustering based MLA, Bayesian networks, reinforcement learning based MLA, representation learning based MLA, similarity and metric learning based MLA, sparse dictionary learning based MLA, genetic algorithms based MLA, and the like. For training the MLA 280, the server 250 may have employed a supervised-learning approach without departing from the scope of the present technology.

Generally speaking, the server 250 can be said to be executing two respective processes in respect of the MLA 280. A first process of the two processes is a training process, executed by the server 250, where the server 250 is configured to train the MLA 280, based on a training set of data, to determine the respective values of the user-specific parameter. To that end, the training set of data may include data of training items indicated, by training users, for purchase on the online listing platform 260.

It should also be noted that the MLA 280 may be trained by a different server, based on a training set of data including data of items from an online listing platform different from the online listing platform 260, without departing from the scope of the present technology.

Further, a second process is an in-use process, executed by the server 250, where the server 250 executes the so-trained MLA 280 for determining the respective values of the user-specific ranking parameter for the set of recommendable items, in accordance with the non-limiting embodiments of the present technology. The in-use process of using the MLA 280 will be described in greater detail below with reference to FIGS. 5 to 7.

In certain non-limiting embodiments of the present technology, the MLA 280 comprises at least two models: a first model (for example, a first model 502 described below with reference to FIG. 5) and a second model (for example, a second model 602 described below with reference to FIG. 6). Accordingly, the server 250 may be configured to train both the first model 502 and the second model 602 based on different respective sets of training data. However, it is also contemplated that the respective sets of training data may at least partially overlap.

Thus, as will also be described in greater detail below, having determined the respective values of the user-specific ranking parameter, the server 250 may be further configured to rank the preselected set of items to further determine the at least one recommended item 225. Further, the server 250 may be configured to transmit the indication of the at least one recommended item 225 to the electronic device 210 to cause presentation thereof to the user 220.

Communication Network

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network are for illustration purposes only. How a respective communication link (not separately numbered) between each one of the electronic device 210, the server 250, and the communication network 240 is implemented will depend, inter alia, on how each one of the electronic device 210 and the server 250 is implemented. Merely as an example and not as a limitation, in those embodiments of the present technology where the electronic device 210 is implemented as a wireless communication device such as the smartphone, the communication link can be implemented as a wireless communication link. Examples of wireless communication links include, but are not limited to, a 3G communication network link, a 4G communication network link, and the like. The communication network 240 may also use a wireless connection with the server 250, and each one of the third-party servers.

Determining Set of Recommendable Items

As alluded to above, to determine the at least one recommended item 225 for presentation to the user 220 for the given item 205 indicated by them for purchase, in some non-limiting embodiments of the present technology, the server 250 may be configured to (1) determine the set of recommendable items; and (2) rank the set of recommendable items according to the user-specific ranking parameter.

Figure 3:
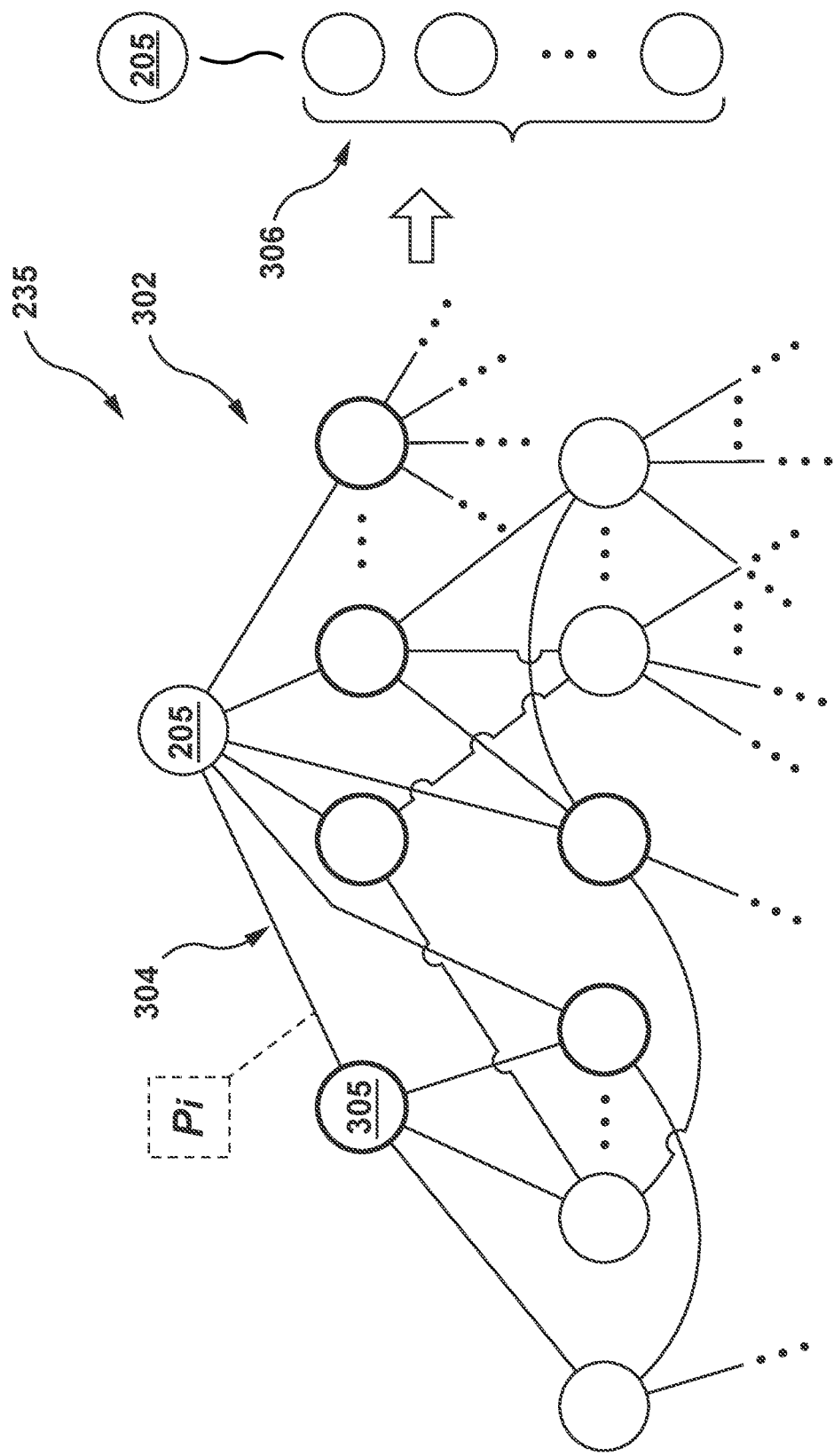
FIG. 3 depicts a schematic diagram of an example electronic representation of a plurality of items of an online listing platform hosted by a server of the networked computing environment of FIG. 2, and used for determining a set of recommendable items, in accordance with certain non-limiting embodiments of the present technology.

With reference to FIG. 3, there is depicted a schematic diagram of an example representation of the plurality of items 235 available for sale on the online listing platform 260, in accordance with certain non-limiting embodiments of the present technology.

As it can be appreciated from FIG. 3, in some non-limiting embodiments of the present technology, the server 250 may be configured to represent the plurality of items 235 in a form of a mutual purchase popularity graph 302. Thus, using the mutual purchase popularity graph 302, the server 250 may be configured to determine a set of recommendable items 306 relative to the given item 205

In some non-limiting embodiments of the present technology, the server 250 may be configured to generate the mutual purchase popularity graph 302 such that a given pair of nodes thereof associated with respective ones of the plurality of items 235—such as the given item 205 and a given recommendable item 305, are joined by a respective edge 304 if at least one prior user has indicated both the given item 205 and the given recommendable item 305 for a joint purchase, prior to receiving the recommendation request 215 from the user 220. Thus, as a non-limiting example, the given item 205 may be a TV set, and the given recommendable item 305 may be a TV wall mounting kit.

As it can be further appreciated, nodes associated with those of the plurality of items 235 that have never been indicated for a joint purchase by the prior users are thus not joined thereamong by edges within the mutual purchase popularity graph 302.

Further, in some non-limiting embodiments of the present technology, each edge of the mutual purchase popularity graph 302, such as the respective edge 304 joining the given pair of nodes associated with the given item 205 and the given recommendable item 305, may be associated with a respective mutual popularity score $P_i$ therebetween, that is, a frequency of occurrence of the given item 205 and the given recommendable item 305 having been indicated for a single purchase by the prior users of the online listing platform. In other words, the respective mutual popularity score $P_i$ can be representative of how often both the given item 205 and the given recommendable item 305 have been put together in the shopping cart of the online listing platform 260 by the prior user. Accordingly, the greater the value of the respective mutual popularity score $P_i$ associated with the respective edge 304 is, the more frequently the prior users have indicated the given recommendable item 305 for purchasing along with the given item 205, and vice versa.

Thus, according to certain non-limiting embodiments of the present technology, the server 250 may be configured to identify, in the plurality of items 235, the set of recommendable items 306 for the given item 205 including items associated with nodes of the mutual purchase popularity graph 302 joined with a node thereof associated with the given item 205 over respective edges—for example, those that are depicted in bold in FIG. 3.

Further, in some non-limiting embodiments of the present technology, the server 250 may be configured to filter out least popular recommendable items from the set of recommendable items 306. To that end, in some non-limiting embodiments of the present technology, the server 250 may be configured to (1) rank recommendable items in accordance with respective mutual popularity scores relative to the given item 205 and (2) select a predetermined number of top recommendable items for inclusion thereof in the set of recommendable items 306. For example, by so doing, the server 250 may be configured to reduce a number of recommendable items in the set of recommendable items 306 to 50, 30, or even 10 most popular items to have been put, by the prior users, in the shopping cart of the online listing platform 260 along with the given item 205.

It should be expressly understood that various non-limiting embodiments of the present technology are not strictly limited to representing, by the server 250, the plurality of items 235 in the form of the mutual purchase popularity graph 302. For example, in some non-limiting embodiments of the present technology, the server 250 may be configured to represent the plurality of items 235 in a form of a tree, such as a B-tree, as an example, generated, by the server 250, for each one of the plurality of items indicated by the user 220 for purchase to determine a respective set of recommendable items associated therewith.

In other non-limiting embodiments of the present technology, the server 250 may be configured to generate an embedding for nodes of the mutual purchase popularity graph 302 within a given multidimensional space. To that end, the server 250 may be configured to generate a respective feature vector for a given node of the mutual purchase popularity graph 302 including features of a respective one of the plurality of items 235 (such as the given item 205) for defining it in a multidimensional space. For example, the features associated with the given item 205 may include respective mutual popularity scores thereof relative to other ones of the plurality of items 235. Further, the server 250 may be configured to map the given item 205 within the multidimensional space by determining its position therein based on the respective feature vector. Accordingly, the server 250 may be configured to identify, for example, those of the plurality of items 235 positioned closer to the given item 205 within the given multidimensional space for inclusion thereof in the set of recommendable items 306.

Determining User Data

As mentioned hereinabove, to determine the at least on recommended item 225, in accordance with certain non-limiting embodiments of the present technology, the server 250 may be configured to determine, based on the user-specific ranking parameter, at least one of the set of recommendable items 306 which is likely to be of interest to the user 220.

To that end, first, in some non-limiting embodiments of the present technology, the server 250 may be configured to determine the user data associated with the user 220. According to certain non-limiting of the present technology, the user data may include user ID data of the user 220 and device ID data of the electronic device 210.

Figure 4:
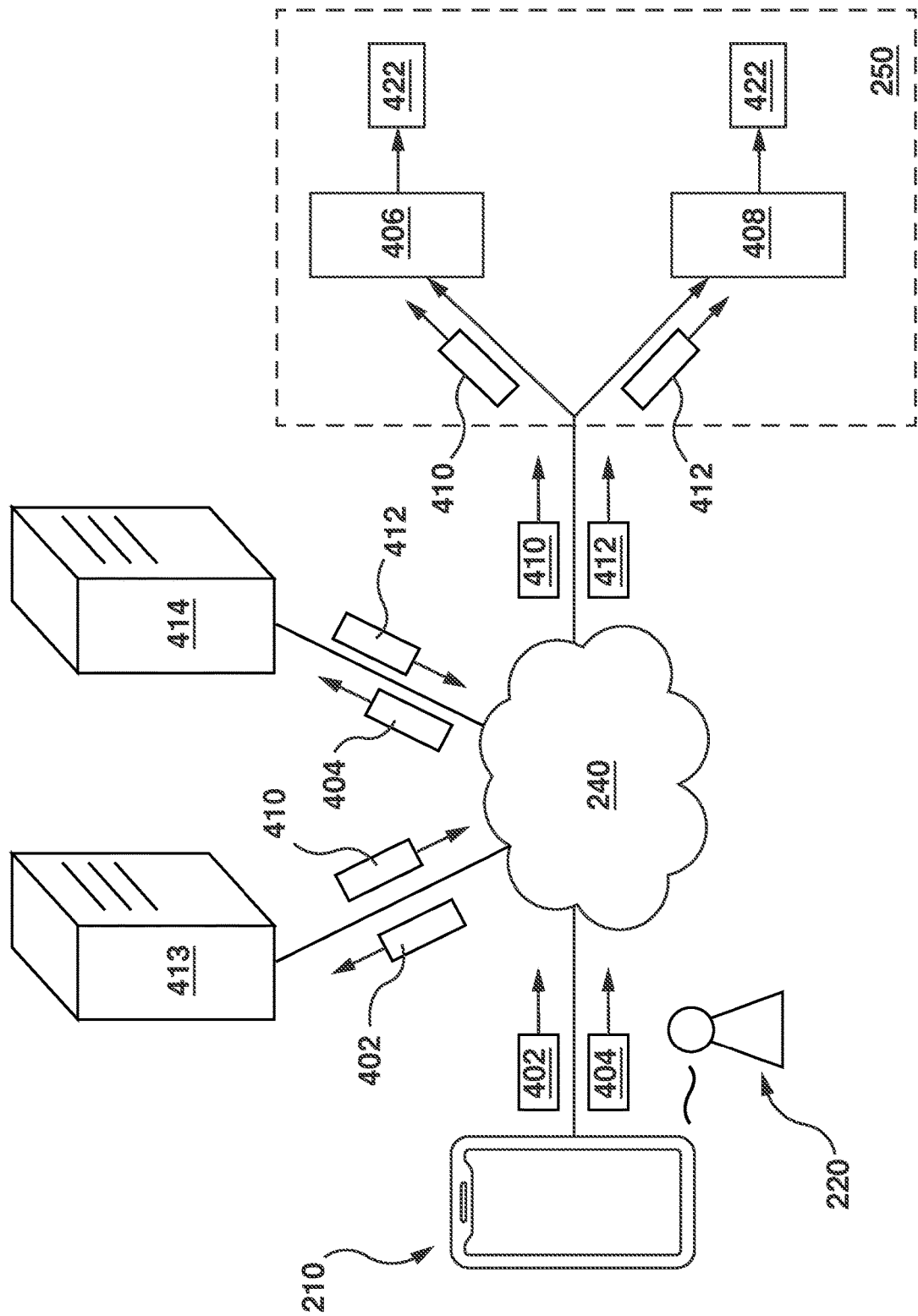
FIG. 4 depicts a schematic diagram of a process for determining, by the server of the networked computing environment of FIG. 2, user data associated with a user of an electronic device present in the networked computing environment of FIG. 2, in accordance with certain non-limiting embodiments of the present technology.

With reference to FIG. 4, there is depicted a schematic diagram of a process for determining, by the server 250, device ID data 410 and user ID data 412 and, in accordance with certain non-limiting embodiments of the present technology.

In some non-limiting embodiments of the present technology, the server 250 may be configured to determine (or otherwise retrieve) each one of the device ID data 410 and the user ID data 412 based on specific identifiers respectively associated with the electronic device 210 and the user 220. For example, in some non-limiting embodiments of the present technology, the server 250 may be configured to receive, from the electronic device 210, a device identifier 402 and a user account identifier 404.

In some non-limiting embodiments of the present technology, the device identifier 402 is a symbol string assigned by a manufacturer of the electronic device 210 and is used for uniquely identifying the electronic device 210 amongst other electronic devices in the communication network 240. However, in other non-limiting embodiments of the present technology, the device identifier 402 may be provided by a manufacturer of an operating system running on the electronic device 210. In specific non-limiting embodiments of the present technology, the device identifier 402 may, for example, be one of (1) an Identifier for Advertising (IDFA) provided by Apple Inc.; and (2) Google Advertising ID provided by Google LLC. Alternatively, MAC address of the electronic device 210 can be used.

To that end, the server 250 may be enabled to access a device system provider server 413 associated with the electronic device 210 to determine, based on the device identifier 402, the device ID data 410 including at least one of a manufacturer of the electronic device 210, a model of the electronic device 210, applications installed on the electronic device 210, geographic data associated with the electronic device 210 including, for example, a primary region of using the electronic device 210, and the like.

In additional non-limiting embodiments of the present technology, the server 250 may further be configured to apply to the device ID data 410 a device feature extraction algorithm 406, thereby representing the device ID data 410 in a form of a device feature vector 420. Broadly speaking, the device feature extraction algorithm 406 may comprise a neural network model trained to generate features associated with a given electronic device, such as the electronic device 210, based on provided data. In other words, generating the device feature vector 420, the device feature extraction algorithm 406 is configured to generate an embedding for the electronic device 210 in an associated multidimensional space.

Further, in some non-limiting embodiments of the present technology, the user account identifier 404 may be a symbol string allowing uniquely identifying the user 220 on the online listing platform 260. However, in other non-limiting embodiments of the present technology, where the online listing platform 260 is one of a plurality of affiliated web applications operated by the same entity as the online listing platform 260, the user account identifier 404 may also be used for identification of the user 220 in each of the plurality of affiliated web applications, as well. For example, in those embodiments where the online listing platform 260 is the Yandex.Market™ online listing platform, affiliated web applications may include, without limitation, a Yandex.Passport™ web application, a Yandex.Browser™ web application, Yandex.Mail™ web application, and the like.

Further, in some non-limiting embodiments of the present technology, the plurality of affiliated web applications may also include one or more third-party web applications, with which the online listing platform 260 partners. Thus, in these embodiments, the user account identifier 404 may also be used for identification of the user 220 in the one or more third-party web applications. Continuing with the example above where the online listing platform is the Yandex.Market™ online listing platform, the one or more third-party web applications may include a VK.COM™ social network. It should be noted that a number and nature of the one or more third-party web application partnering the online listing platform 260 is not limited.

Thus, in some non-limiting embodiments of the present technology, the server 250 may be enabled to access an affiliated application server 414 associated with at least one of the plurality of affiliated web applications to determine the user ID data 412 including, for example, at least one sociodemographic characteristic of the user 220, which may include, without limitation, an age of the user 220, a gender of the user 220, an employment status of the user 220, an average income of the user 220, and the like.

Further, in some non-limiting embodiments of the present technology, the server 250, from the affiliated application server 414, may be configured to access a browsing history of the user 220; and the user ID data 412 may further include, for example, browsing statistics for the user 220. For example, the server 250 may be configured to determine data of the user 220 visiting a plurality of web resources. The plurality of web resources may include a predetermined top number of most visited web resources (such as 100, 500, or 1000, as an example) on the communication network 240 determined by the server 250. In some non-limiting embodiments of the present technology, the server 250 may be configured to update the predetermined top number of most visited web resources from time to time, such as at a predetermined frequency, such as daily, weekly, monthly, and the like.

In some non-limiting embodiments of the present technology, using the browsing history of the user 220, the server 250 may further be configured to determine (for example, heuristically or using a trained Machine Learning Algorithm), and further include in the user ID data 412, data indicative of one or more user interests of the user 220. To that end, analyzing the browsing statistics, the server 250 may, for example, be configured to determine that the user 220 regularly visits a web resource associated with a given mobile connection provider and subsequently makes payments therein. Thus, the server 250 may be configured to determine that the user 220 is a client of the given mobile connection provider. In another example, the server 250 may be configured to determine music preferences (that is, of particular music genres, such as rock, pop, author song, and the like) of the user 220 based on a recent history of music played via an online music subscription service associated with the user 220. In yet another example, the server 250 may be configured, based on a history of online grocery shopping of the user 220, to determine an estimate of average spending of the user 220 on food.

In additional non-limiting embodiments of the present technology, the server 250 may be configured to apply to the user ID data 412 a user feature extraction algorithm 408, thereby representing the user ID data 412 in a form of user feature vector 422. In some non-limiting embodiments of the present technology, the user feature extraction algorithm 408 may be implemented similarly to the device feature extraction algorithm 406 and thus may be configured to generate, based on the user ID data, features associated with the user 220, thereby generating a respective embedding for the user 220 in an associated multidimensional space.

In specific non-limiting embodiments of the present technology, the user feature extraction algorithm 408 may be a site2vec feature extraction algorithm. It should be expressly understood that other user feature extraction algorithms can be envisioned without departing from the scope of the present technology.

Determining User-Specific Ranking Parameter

Further, having determined the user data associated with the user 220, according to certain non-limiting embodiments of the present technology, the server 250 may be configured to apply the MLA 280 to determine the user-specific ranking parameter to rank the set of recommendable items 306 to determine the at least one recommended item 225 for the given item 205.

According to certain non-limiting embodiments of the present technology, the MLA 280 may include at least two models trained to generate respective likelihood parameters indicative of that the user 220 would find each one of the set of recommendable items 306 of interest based on different input data, based on which the MLA 280 may further be configured to determine respective values of the user-specific ranking parameter.

Figure 5:
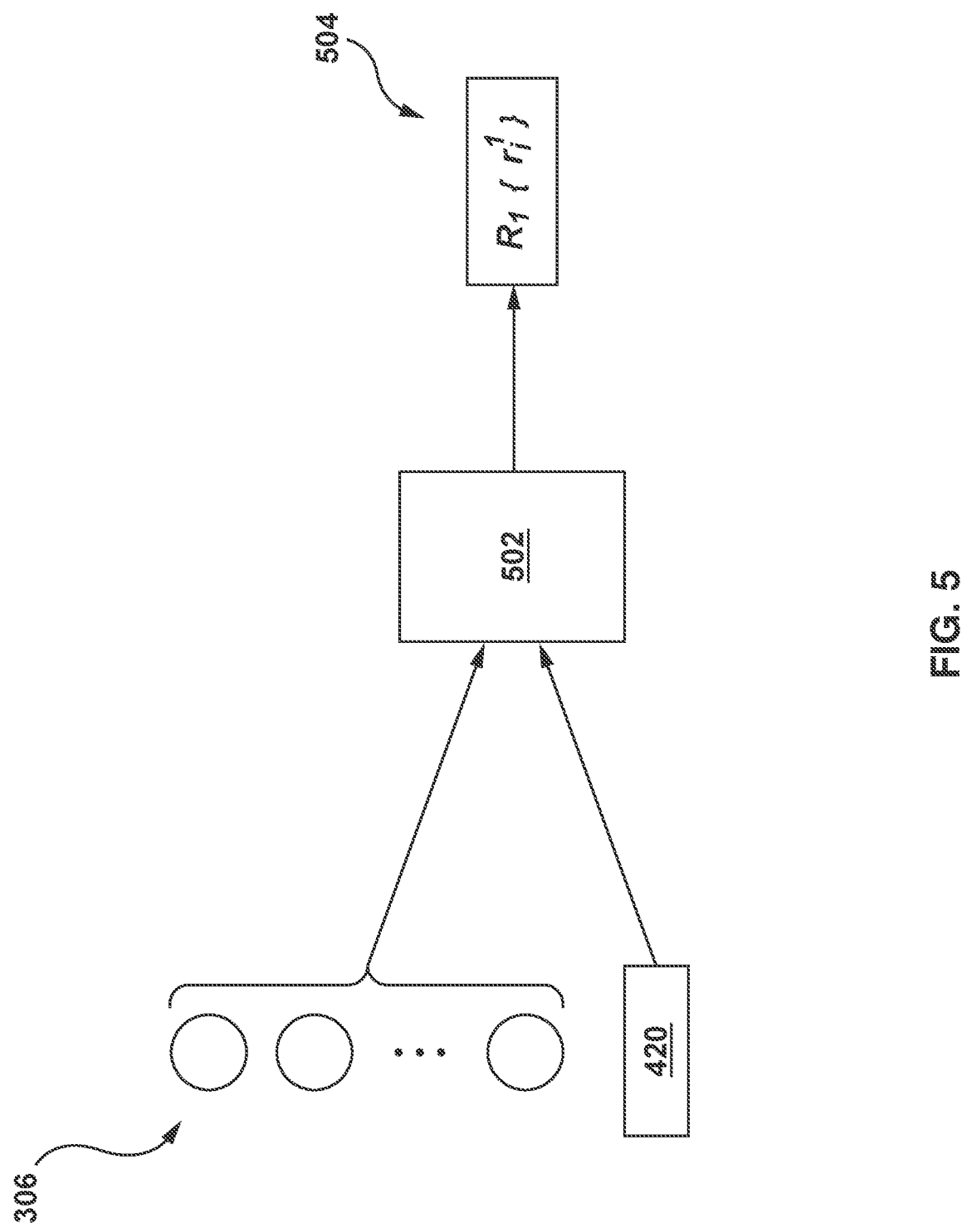
FIG. 5 depicts a schematic diagram of a process for applying, by the server present in the networked computing environment of FIG. 2, a first model to the set of recommendable items of FIG. 3 to generate, based on at least a portion of the user data of FIG. 4, respective values of a first likelihood parameter used for determining respective values of a user-specific ranking parameter, in accordance with certain non-limiting embodiments of the present technology.

With reference to FIG. 5, there is depicted a schematic diagram of a process for applying, by the server 250, the first model 502, in accordance with certain non-limiting embodiments of the present technology.

In some non-limiting embodiments of the present technology, the first model 502 may be trained, based on a first training set of data including training device ID data of various training users, to determine, in the in-use process, a likelihood value of a given user (such as the user 220) perceiving a given item—such as that of the plurality of items 235 of the online listing platform 260—as being of interest to the given user.

Thus, the server 250 may be configured to feed the device feature vector 420 associated with the user 220 along with the set of recommendable items 306 to the first model 502 to determine a first array 504 including respective likelihood values $R_1\{r_i^1\}$, wherein a given element of the first array 504 is indicative of a likelihood value, given the device ID data 410 alone, that the user 220 would perceive a respective one of the set of recommendable items 306 as being of interest to them.

Further, with reference to FIG. 6, there is depicted a schematic diagram of a process for applying, by the server 250, the second model 602, in accordance with certain non-limiting embodiments of the present technology.

In some non-limiting embodiments of the present technology, the second model 602 may be trained, based on a second training set of data including training user ID data of various training users, to determine, in the in-use process, a likelihood value of the user 220 perceiving the given item as being of interest to them.

Thus, the server 250 may be configured to feed the user feature vector 422 associated with the user 220 along with the set of recommendable items 306 to the second model 602 to determine a second array 604 including respective likelihood values $R_2\{r_i^2\}$, wherein a given element of the second array 604 $r_i^2$ is indicative of a likelihood value, given the user ID data 412 alone, that the user 220 would perceive the respective one of the set of recommendable items 306 as being of interest to them.

According to some non-limiting embodiments of the present technology, the server 250 may be configured to re-train each one of the first model 502 and the second model 602 from time to time, such as at a predetermined frequency—such as daily, weekly, and the like. In some non-limiting embodiments of the present technology, the server 250 may be configured to re-train a given one of the first model 502 and the second model 602 upon updating a respective one of the device ID data 410 and the user ID data 412.

Further, as the server 250 may be configured to train each one of the first model 502 and the second model 602 based on different, independently generated training sets of data— that is, the first training set of data and the second training set of data, respectively—where a given one of the first training set of data and the second training set of data does not include data resulted from operation of a model trained based on an other one thereof, it should be noted that each one of the first model 502 and the second model 602 can thus be said to be trained independently.

It should be noted that it is not limited as to how each one of the first model 502 and the second model 602 is implemented; and in some non-limiting embodiments of the present technology, each one thereof may be implemented based on neural networks. In specific non-limiting embodiments of the present technology, a given one of the first model 502 and the second model 602 may be implemented based on a neural network algorithm including, without limitation, at least one of: an ASSIST neural network algorithm, an Apoc neural network algorithm, and an IsoMIF neural network algorithm, as an example.

Further, to determine the respective values of the user-specific ranking parameter for the set of recommendable items 306, in some non-limiting embodiments of the present technology, the server 250 may be configured to concatenate elements of the first array 504 with respective elements the second array 604. In some non-limiting embodiments of the present technology, before concatenating, the server 250 may be configured to assign elements of each one of the first array 504 and the second array 604 with a respective predetermined weight value indicative of a respective contribution of each one of the first array 504 and the second array 604 to the respective values of the user-specific ranking parameter.

Thus, to concatenate the elements of the first array 504 with the respective elements of the second array 604, in some non-limiting embodiments of the present technology, the server 250 may be configured to apply thereto one or more mathematical operations, such as addition, multiplication, averaging, and the like.

However, in other non-limiting embodiments of the present technology, the server 250 may be configured to apply a third model of the MLA 280. With reference to FIG. 7, there is depicted a schematic diagram of a process for applying, by the server 250, a third model 702, in accordance with certain non-limiting embodiments of the present technology.

In some non-limiting embodiments of the present technology, the third model 702 may be trained, based on a third training set of data including training device ID data and training user ID data, corresponding thereto, associated with various training users, to determine, in the in-use process, a likelihood value of the user 220 perceiving the given item as being of interest to them. Accordingly, the server 250 may be configured to determine a given value of the user-specific ranking parameter, for the given one of the set of recommendable items 306, as being a respective likelihood value determined by the third model 702.

To that end, the server 250 may be configured to feed (1) the first array 504 generated by the first model 502 along with the device feature vector 420 associated with the electronic device 210 and (2) the second array 604 generated by the second model 602 along with the user feature vector 422 associated with the user 220 to the third model 702. Consequently, the third model 702 may be thus be configured to generate a third array 704 including the respective values of the user-ranking parameter R{$r_i$}, wherein a given element thereof $r_i$ is indicative of a likelihood value, given both the device ID data 410 and the user ID data 412 associated with the user 220, that the user 220 would perceive the respective one of the set of recommendable items 306 as being of interest to them.

In specific non-limiting embodiments of the present technology, the third model 702 may comprise a CatBoost model operated by Yandex LLC of 16 Lev Tolstoy Street, Moscow, 119021, Russia. It should be noted that other machine learning models may be used without departing from the scope of the present technology.

Further, in some non-limiting embodiments of the present technology, using the third array 704, the server 250 may be configured to rank the set of recommendable items 306 in accordance with the respective values of the user-specific ranking parameter, thereby generating a ranked set of recommendable items (not depicted). Further, the server 250 may be configured to determine the at least one recommended item 225 as being one or more top recommendable items of the ranked set of recommendable items.

Finally, the server 250 may be configured to transmit the indication of the at least one recommended item 225 to the electronic device 210 for the presentation thereof, in the interface of the shopping cart of the online listing platform 260, to the user 220.

It should be noted that, in other non-limiting embodiments of the present technology, the server 250 may be configured to postpone the transmission of the indication of the at least one recommendable item 225 to the electronic device 210 until one of future user interactions of the user 220 on the online listing platform 260—such as indicating, at a future moment in time, an other one of the plurality of items 235 for purchase, different from the given item 205. In other words, the server 250 may be configured to execute the recommendation request 215 associated with the given item 205 in response to the user 220 indicating the other one of the plurality of items 235 for purchase at the future moment in time.

Method

Figure 8:
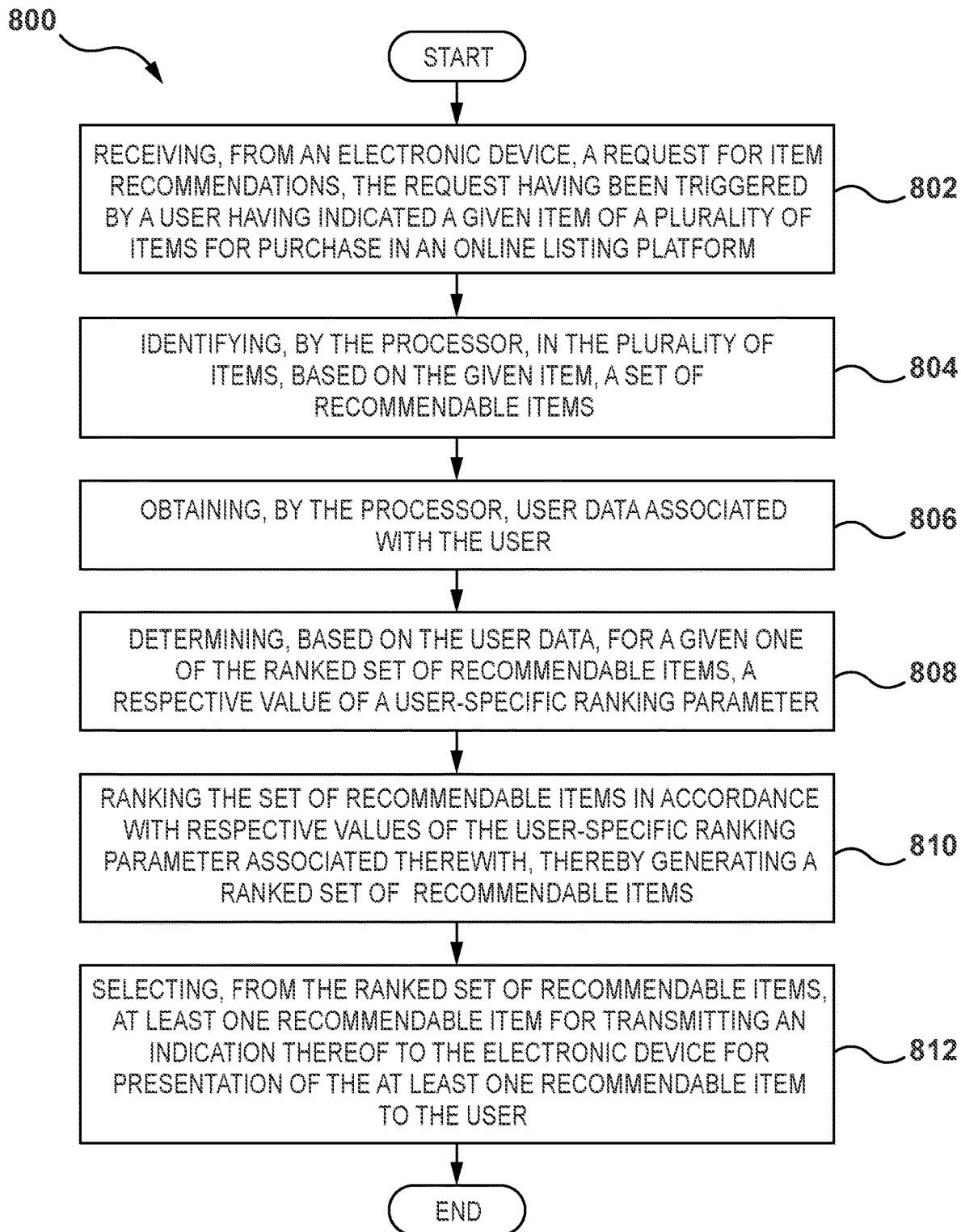
FIG. 8 depicts a flowchart diagram of a method of providing, by the server present in the networked computing environment in FIG. 2, item recommendations, in accordance with certain non-limiting embodiments of the present technology.

Given the architecture and the examples provided hereinabove, it is possible to execute a method for recommending items in an online listing platform, such as the online listing platform 260. With reference now to FIG. 8, there is depicted a flowchart of a method 800, according to certain non-limiting embodiments of the present technology. The method 800 may be executed by server 250.

Step 802: Receiving, from an Electronic Device, a Request for Item Recommendations, the Request Having Been Triggered by a User Having Indicated a Given Item of a Plurality of Items for Purchase in an Online Listening Platform According to certain non-limiting embodiments of the present technology, the method 800 commences at step 800 with the server 250 being configured to receive a request for item recommendation. For example, as described above with reference to FIG. 2, the server 250 may be configured to receive the recommendation request 215 triggered by the electronic device 210 in response to the user 220 indicating the given item 205 of the plurality of items 235 for purchase in the online listing platform 260.

The method 800 thus proceeds to step 804.

Step 804: Identifying, by the Processor, in the Plurality of Items, Based on the Given Item, a Set of Recommendable Items Further, at step 804, according to certain non-limiting embodiments of the present technology, the server 250 may be configured to identify, in the plurality of items 235, the set of recommendable items 306 for the given item 205. To that end, the server 250 may be configured to represent the plurality of items 235 as the mutual purchase popularity graph 302 depicted in FIG. 3.

Thus, in some non-limiting embodiments of the present technology, as described above with reference to FIG. 3, the server 250 may be configured to determine the set of recommendable items 306 based on respective mutual popularity scores of each one of the plurality of items 235 relative to the given item 205—such as that indicated by the respective edge 304 between the nodes associated with the given item 205 and the given recommendable item 305 within the mutual purchase popularity graph 302.

As mentioned above, the server 250 may be configured to determine the respective mutual popularity score between the given item 205 and the given recommendable item 305 as being indicative of the frequency of occurrence of them having been indicated for a joint purchase by the prior users of the online listing platform 260.

In some non-limiting embodiments of the present technology, the server may further be configured to rank the set of recommendable items in accordance with the respective mutual popularity scores associated therewith and further leave, in the set of recommendable items 306, only the predetermined number (such as 50, 30, or 10) of most popular items.

The method 800 hence advances to step 806.

Step 806: Obtaining, by the Processor, User Data Associated with the User

Further, in some non-limiting embodiments of the present technology, to determine the at least one recommended item 225 in response to the recommendation request 215, the server 250 may be configured to determine the user-specific ranking parameter to rank each one of the set of recommendable items 306.

To that end, at step 806, the server 250 may be configured to determine the user data of the user 220. For example, as described above with reference to FIG. 4, the server 250 may be configured to receive the device identifier 402 of the electronic device 210 and the user account identifier 404 of the user 220 with the online listing platform 260, and access the device system provider server 413 and the affiliated application server 414 to determine (or otherwise retrieve) the device ID data 410 and the user ID data 412, respectively.

As further noted above, the device ID data 410 may include at least one of the manufacturer of the electronic device 210, the model of the electronic device 210, the applications installed on the electronic device 210, the geographic data associated with the electronic device 210 including, for example, the primary region of using the electronic device 210, and the like. On the other hand, the user ID data 412 may include, without limitation, at least one of the at least one sociodemographic characteristic of the user 220; the browsing statistics of the plurality of web resources, such as the predetermined number of most visited web resources by the user 220 on the communication network 240; and the data indicative of the one or more user interest of the user 220.

In additional non-limiting embodiments of the present technology, the server 250 may be configured to apply to each one of the device ID data 410 and the user ID data 412, respectively, the device feature extraction algorithm 406 and the user feature extraction algorithm 408, thereby generating the device feature vector 420 and the user feature vector 422 for further use.

The method 800 thus proceeds to step 808.

Step 808: Determining, Based on the User Data, for a Given One of the Ranked Set of Recommendable Items, a Respective Value of a User-Specific Ranking Parameter Further, at step 808, in some non-limiting embodiments of the present technology, the server 250 may be configured, based on the so determined user data, to determine, for each one of the set of recommendable items 306, the respective values of the user-specific ranking parameter associated therewith.

For example, as described above, the server 250 may be configured to apply to the set of recommendable items the MLA 280 trained to determine the respective values of the user-specific ranking parameter based on the user data associated with the user 220.

More specifically, in some non-limiting embodiments of the present technology, as described above with reference to FIG. 5, the server 250 may be configured to apply the first model 502 to the device feature vector 420 to generate, for the set of recommendable items 306, the first array 504, the given element of which is indicative of the likelihood value that the user 220 would perceive, given the device ID data 410 alone, the respective one of the set of recommendable items 306 as being of interest to them.

Further, as described above with reference to FIG. 6, the server 250 may be configured to apply the second model 602 to the user feature vector 422 to generate, for the set of recommendable items 306, the second array 604, the given element of which is indicative of the likelihood value that the user 220 would perceive, given the user ID data 412 alone, the respective one of the set of recommendable items 306 of being of interest to them.

As mentioned above, each one of the first model 502 and the second model 602 may be implemented based on neural networks. In specific non-limiting embodiments of the present technology, a given one of the first model 502 and the second model 602 may be implemented based on a neural network algorithm including, without limitation, at least one of: the ASSIST neural network algorithm, the Apoc neural network algorithm, and the IsoMIF neural network algorithm, as an example.

In some non-limiting embodiments of the present technology, the server 250 may be configured to assign elements of each one of the first array 504 and the second array 604 with the respective predetermined weight value indicative of the respective contribution of each one of the first array 504 and the second array 604 to the respective values of the user-specific ranking parameter.

Thus, in some non-limiting embodiments of the present technology, the server 250 may further be configured to concatenate, such as multiply or average, pairwise, as an example, the respective elements of the first array 504 and the second array 604 to determine the respective values of the user-specific ranking parameter.

However, as described above with reference to FIG. 7, according to certain non-limiting embodiments of the present technology, the server 250 may apply the third model 702 of the MLA 280 to both the first array 504 and the second array 604 to generate the third array 704 including the respective values of the user-specific ranking parameter for the each one of the set of recommendable items 306, the given value of which is thus indicative of the likelihood value that the user 220 would perceive, given both the device ID data 410 and the user ID data 412, the respective one of the set of recommendable items 306 as being of interest to them.

In some non-limiting embodiments of the present technology, the third model 702 may comprise the CatBoost model.

The method 800 hence advances to step 810.

Step 810: Ranking the Set of Recommendable Items in Accordance with Respective Values of the User-Specific Ranking Parameter Associated therewith, thereby Generating a Ranked Set of Recommendable Items Further, at step 810, in some non-limiting embodiments of the present technology, the server 250 may be configured to rank each one of the set of recommendable items 306 in accordance with the respective values of the user-specific ranking parameter associated therewith to generate the ranked set of recommendable items.

The method 800 thus proceeds to step 812.

Step 812: Selecting from the Ranked Set of Recommendable Items, at Least One Recommendable Item for Transmitting an Indication Thereof to the Electronic Device for Presentation of the at Least One Recommendable Item to the User Finally, at step 812, in accordance with certain non-limiting embodiments of the present technology, the server 250 may be configured to determine the at least one recommended item 225 as being the one or more top recommendable items of the ranked set of recommendable items.

Further, the server 250 may be configured to transmit the indication of the at least one recommended item 225 to the electronic device 210 for presentation thereof to the user 220, for example, in the interface of the shopping cart of the online listing platform 260 along with the given item 205 previously indicated by the user 220 for purchase.

However, in other non-limiting embodiments of the present technology, the server 250 may be configured to postpone the transmission of the indication of the at least one recommendable item 225 to the electronic device 210 until one of future user interactions of the user 220 on the online listing platform—such as indicating, at the future moment in time, by the user 220, the other one of the plurality of items 235 for purchase, the other one of the plurality of items 235 being different from the given item 205.

Thus, certain embodiments of the method 800 may allow recommending items on the online listing platform 260 to the user 220 more effectively by providing recommendable items that would likely interest the user 220 to interact therewith. This may eventually improve the user experience of the user 220 and help increasing the average purchase size on the online listing platform 260.

The method 800 thus terminates.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer-implemented method of recommending items in an online listing platform, the online listing platform being hosted by a server, the server having access to a memory device storing:
   a plurality of items for sale in the online listing platform, a given pair of items of the plurality of items being associated with a respective mutual popularity score indicative of a frequency of occurrence of the given pair of items having been selected, by prior users of the online listing platform, for a single purchase;
the method comprising:
   receiving, from an electronic device of a user, a request for item recommendations, the request having been triggered by the user having indicated a given item of the plurality of items for purchase in the online listing platform;
   identifying in the plurality of items, based on the given item, a set of recommendable items,
      the identifying being based on the respective mutual popularity scores of the plurality of items relative to the given item;
   obtaining user data associated with the user,
      the user data including user browsing data and user device data of the electronic device;
   determining, based on the user data, for a given one of the ranked set of recommendable items, a respective value of a user-specific ranking parameter,
      the respective value of the user-specific ranking parameter being indicative of a likelihood value of the user perceiving the given one of the ranked set of recommendable items as being of interest to the user;
      the determining including:
         applying a machine-learning algorithm (MLA), the MLA including a first model and a second model,
            the first model having been trained to determine a first likelihood value of the user perceiving the given one of the ranked set of recommendable items as being of interest to the user based on the user browsing data; and
            the second model having been trained to determine a second likelihood value of the user perceiving the given one of the ranked set of recommendable items as being of interest to the user based on the user device data;
         generating, by applying a user feature extraction algorithm to the user browsing data, a user feature vector;
         generating, by applying a device feature extraction algorithm to the device data, a device feature vector;
         feeding the user feature vector to the first model to generate the first likelihood value;
         feeding the device feature vector to the second model to generate the second likelihood value; and
         concatenating the first likelihood value and the second likelihood value;
   ranking the set of recommendable items in accordance with respective values of the user-specific ranking parameter associated therewith, thereby generating a ranked set of recommendable items; and
   selecting, from the ranked set of recommendable items, at least one recommendable item for transmitting an indication thereof to the electronic device for presentation of the at least one recommendable item to the user.

2. The method of claim 1, wherein the respective mutual popularity score associated with the given pair of items has been determined based on historical data of the prior users of the online listing platform.

3. The method of claim 1, wherein the identifying the set of recommendable items further comprises:
   ranking the plurality of items according to the respective mutual popularity scores associated therewith relative to the given item; and
   selecting a predetermined top number of items from the plurality of items for inclusion thereof in the set of recommendable items.

4. The method of claim 1, wherein the plurality of items is representable in a form of a graph, wherein:
   a given node of the graph is representative of a respective one of the plurality of items, and
   a given edge of the graph joining a given pair of nodes associated with the given pair of items is representative of the respective mutual popularity score therebetween,
   and wherein the identifying the set of recommendable items comprises:
      identifying nodes of the graph joined with a node associated with the given item by respective edges.

5. The method of claim 1, wherein the user data associated with the user includes one or more sociodemographic characteristics of the user, and wherein the obtaining the user data includes determining the one or more sociodemographic characteristics thereof.

6. The method of claim 5, wherein the one or more sociodemographic characteristics includes at least one of an age of the user, a gender of the user, an employment status of the user, and an average income of the user.

7. The method of claim 1, wherein each one of the first likelihood value and the second likelihood value is assigned with a respective predetermined weight value.

8. The method of claim 1, wherein the first model and the second model have been trained independently.

9. The method of claim 1, wherein the user browsing data includes data of the user browsing a plurality of predetermined web resources.

10. The method of claim 1, wherein the user device data includes at least one of:
    a model of the electronic device; a manufacturer of the electronic device; a geographical data from the electronic device; and a data of applications installed on the electronic device.

11. The method of claim 1, wherein each one of the first model and the second model is re-trained at a predetermined frequency.

12. The method of claim 1, wherein the presentation of the at least one recommendable item to the user is executed for a future request for item recommendations triggered by the user indicating an other item of the plurality of items for purchase on the online listing platform, the other item being different from the given item.

13. A system for recommending items in an online listing platform, the system comprising a server hosting the online listing platform, the server including:
    at least one processor communicatively coupled with an electronic device of a user;
    at least one memory device storing:
       a plurality of items for sale in the online listing platform, a given pair of items of the plurality of items being associated with a respective mutual popularity score indicative of a frequency of occurrence of the given pair of items having been selected, by prior users of the online listing platform, for a single purchase; and computer-readable instructions;

the computer-readable instructions, when executed by the at least one processor, causing the system to:

receive, from the electronic device, a request for item recommendations, the request having been triggered by the user having indicated a given item of the plurality of items for purchase in the online listing platform;

identify, in the plurality of items, based on the respective mutual popularity scores of the plurality of items relative to the given item, a set of recommendable items, obtain user data associated with the user;
  the user data including user browsing data and user device data of the electronic device:
determine, based on the user data, for a given one of the ranked set of recommendable items, a respective value of a user-specific ranking parameter,
  the respective value of the user-specific ranking parameter being indicative of a likelihood value of the user perceiving the given one of the ranked set of recommendable items as being of interest to the user;
  determining including:
    applying a machine-learning algorithm (MLA), the MLA including a first model and a second model,
      the first model having been trained to determine a first likelihood value of the user perceiving the given one of the ranked set of recommendable items as being of interest to the user based on the user browsing data; and
      the second model having been trained to determine a second likelihood value o the user perceiving the given one of the ranked set of recommendable items as being of interest to the user based on the user device data;
    generating, by applying a user feature extraction algorithm to the user browsing data, a user feature vector:
    generating, by applying a device feature extraction algorithm to the device data, a device feature vector;
    feeding the user feature vector to the first model to generate the first likelihood value;
    feeding the device feature vector to the second model to generate the second likelihood value; and
    concatenating the first likelihood value and the second likelihood value;

rank the set of recommendable items in accordance with respective values of the user-specific ranking parameter associated therewith, thereby generating a ranked set of recommendable items; and select, from the ranked set of recommendable items, at least one recommendable item for transmitting an indication thereof to the electronic device for presentation of the at least one recommendable item to the user.

14. The system of claim 13, wherein the at least one processor has caused the system to determine the respective mutual popularity score associated with the given pair of items based on historical data of the prior users of the online listing platform.

15. The system of claim 13, wherein to identify the set of recommendable items, the at least one processor further causes the system to:
rank the plurality of items according to the respective mutual popularity scores associated therewith relative to the given item; and
select a predetermined top number of items from the plurality of items for inclusion thereof in the set of recommendable items.

16. The system of claim 13, wherein the at least one processor causes the system to represent the plurality of items in a form of a graph, wherein:
a given node of the graph is representative of a respective one of the plurality of items, and
a given edge of the graph joining a given pair of nodes associated with the given pair of items is representative of the respective mutual popularity score therebetween, and wherein to identify the set of recommendable items, the processor is configured to:
identify nodes of the graph joined with a node associated with the given item by respective edges.

17. The system of claim 13, wherein the user data associated with the user includes one or more sociodemographic characteristics of the user, and wherein to obtain the user data the processor is configured to determine the one or more sociodemographic characteristics thereof.

* * * * *